United States Patent
Arndt Dr habil et al.

(10) Patent No.: US 10,328,760 B2
(45) Date of Patent: Jun. 25, 2019

(54) VEHICLE SUSPENSION AND METHOD FOR CONTROLLING SAME

(71) Applicant: Ford Global Technologies, LLC, Dearborn, MI (US)

(72) Inventors: Christoph Arndt Dr habil, Rheinland-Pfalz (DE); Uwe Gussen, Huertgenwald (DE)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 15/017,120

(22) Filed: Feb. 5, 2016

(65) Prior Publication Data
US 2016/0229248 A1   Aug. 11, 2016

(30) Foreign Application Priority Data
Feb. 6, 2015   (DE) .................. 10 2015 202 100

(51) Int. Cl.
*B60G 21/05*   (2006.01)
*B60G 17/015*   (2006.01)

(52) U.S. Cl.
CPC ......... *B60G 17/015* (2013.01); *B60G 21/051* (2013.01); *B60G 21/053* (2013.01); *B60G 2200/20* (2013.01); *B60G 2204/1434* (2013.01); *B60G 2204/4106* (2013.01); *B60G 2401/10* (2013.01); *B60G 2600/18* (2013.01)

(58) Field of Classification Search
CPC ... B60G 17/015; B60G 21/051; B60G 21/053
See application file for complete search history.

(56) References Cited

U.S. PATENT DOCUMENTS

| | | | |
|---|---|---|---|
| 1,981,449 A * | 11/1934 | Fageol | B60G 5/053 180/24.02 |
| 6,219,134 B1 | 4/2001 | Voeller et al. | |
| 7,123,111 B2 * | 10/2006 | Brunson | G01C 19/5684 331/116 M |
| 7,733,200 B2 * | 6/2010 | Aksyuk | B81B 3/0024 200/181 |
| 9,157,832 B2 * | 10/2015 | Uluyol | G01M 13/045 |
| 9,442,040 B2 * | 9/2016 | Katsaros | G01L 1/255 |
| 2006/0176158 A1 | 8/2006 | Fleming | |
| 2006/0238279 A1 * | 10/2006 | Lu | H01H 61/04 335/78 |
| 2006/0273530 A1 * | 12/2006 | Zuber | B60G 7/006 280/5.52 |

(Continued)

FOREIGN PATENT DOCUMENTS

DE       102012215600 A1    3/2014

*Primary Examiner* — Faye M Fleming
(74) *Attorney, Agent, or Firm* — Raymond L. Coppiellie; Burgess Law Office, PLLC

(57) ABSTRACT

A vehicle suspension system having a twist beam axle including a crossbeam and two trailing arms connected thereto. The rear ends of each trailing arm, in the motor vehicle longitudinal direction, having with a wheel mount for fastening a motor vehicle wheel. The front ends of each trailing arm connected via a bearing to the motor vehicle body. Each bearing associated with a MEMS designed as an actuator wherein movements of the bearings and therefore the twist beam axle about the vertical motor vehicle axis can be caused or unfavorable movements of the twist beam axle can be counteracted.

19 Claims, 2 Drawing Sheets

(56) References Cited

U.S. PATENT DOCUMENTS

| | | |
|---|---|---|
| 2008/0238247 A1 | 10/2008 | Richter |
| 2009/0106990 A1 | 4/2009 | Harrill et al. |
| 2014/0145498 A1* | 5/2014 | Yamakado ............ B60T 8/1755 303/3 |
| 2016/0187202 A1* | 6/2016 | Miller ........................ G01J 5/10 250/338.1 |

* cited by examiner

VEHICLE SUSPENSION AND METHOD FOR CONTROLLING SAME

CROSS-REFERENCE TO RELATED APPLICATIONS

Not Applicable.

BACKGROUND OF THE INVENTION

1. Field of the Invention

The invention relates to a vehicle suspension system; and more specifically to a suspension system having a twist beam axle and a method for controlling said suspension.

2. Description of Related Art

One example of a rear axle for motor vehicles having front-wheel drive is a twist beam axle. A twist beam axle generally includes two trailing arms, both of which are rigid with respect to torsion and bending, and which are attached to a pivotable crossbeam, i.e., torsion-flexible, but bending-rigid. The crossbeam typically has a U-shaped or T-shaped profile. In the event of deflection and rebound on both sides, the crossbeam behaves like a rigid axis. However, in the event of deflection and rebound on one side it twists and acts as a stabilizer. Wheel mounts, typically attached on the rear ends of the trailing arms, secure the vehicle wheels. The front ends of the trailing arms of the twist beam axle connect, via bearings, particularly rubber bearings, to the motor vehicle body. For a high level of travel comfort, the rubber bearings often comprise a soft material, wherein road irregularities are filtered out by the soft rubber bearings.

Variation of the travel direction of the motor vehicle results in lateral forces causing twisting and rocking of the twist beam axle, correspondingly resulting in changes of the wheel position in the longitudinal direction (toe change) and in the vertical direction (camber change) of the motor vehicle. These changes of the wheel position, by way of forces acting on the wheels in the transverse direction of the motor vehicle, can be calculated beforehand in consideration of the geometry of the wheels and the twist beam axle in particular and can be counteracted by design-based measures. In one case, for example using a harder material in the bearings achieves higher toe stability; however, the harder material, i.e., a hard bearing, provides less damping than a soft bearing.

SUMMARY OF THE INVENTION

One example of the present invention includes a vehicle suspension system including a twist beam axle having a crossbeam and a trailing arm having a front end. A bearing connects the front end of the trailing arm to the vehicle. A micro-electromechanical system (MEMS) functioning as an actuator located adjacent the bearing causes movement of the bearing or counteracts movement of the bearing.

A further example includes a method for controlling a vehicle suspension having a crossbeam and a trailing arm. A bearing connects a front end of the trailing arm to the vehicle wherein a MEMS adjacent the bearing functions as an actuator whereby the MEMS moves the bearing in relation to the vehicle body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

As used herein, the term "motor vehicle" is understood as a land vehicle driven by a motor(s), in one example, a passenger automobile.

As used herein, the term "actuator" is a device that converts control commands into mechanical movement and causes an effect at the same time. For example, in this application the force action on the trailing arms. An actuator can also be referred to as an effector. If an actuator causes linear movement, it is a linear actuator.

As used herein, the term "motor vehicle longitudinal direction" is the orientation of the extension of a motor vehicle from the front end to the rear end. The front end of the motor vehicle is in front and the rear of the motor vehicle is at the rear.

As used herein, the term "motor vehicle transverse direction" is the orientation of the extension of a motor vehicle from the right side to the left side and vice versa.

As used herein, the term "vertical axis" is oriented from bottom to top and perpendicular to the motor vehicle longitudinal direction and the motor vehicle transverse direction.

As used herein, the terms "left and right" relate to the sides of the motor vehicle viewed from the front, i.e., from the view of the front end of the motor vehicle.

As used herein, the term "MEMS" stands for "micro-electromechanical system," also referred to as a microsystem(s); these are miniaturized devices, the components of which have dimensions in the micrometer range and interact as a system.

Figure 1:
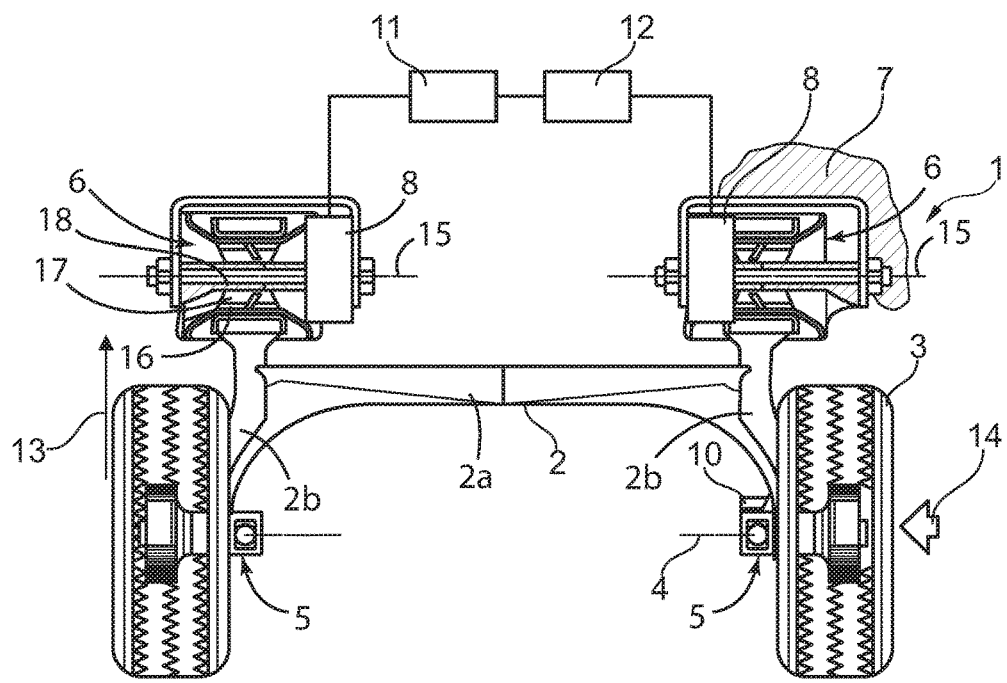
FIG. 1 shows an embodiment of the device according to the invention in a top view.

FIG. 1 illustrates an embodiment of the system, seen generally at 1, for dynamically acquiring and setting travel properties of a motor vehicle. In the disclosed example, the vehicle includes a twist beam axle 2 having a crossbeam 2a and two trailing arms 2b connected thereto, each extending rearwardly in the motor vehicle longitudinal direction 13. Wheel mounts 5, for fastening motor vehicle wheels 3, are at the rear ends of the trailing arms 2b. The trailing arms 2b are each connected on the front ends thereof via a bearing, seen generally at 6, to the vehicle body 7.

As illustrated, the twist beam axle 2 includes two trailing arms 2b, which are rigid regarding torsion and bending, and are welded to the crossbeam 2a, which is rigid regarding bending but is torsion-flexible. The wheels 3 attached to wheel mounts 5 are rotatable about an axis of rotation 4. Bearings 6, via which the trailing arms 2b and therefore the twist beam axle 2 are connected to the motor vehicle body 7, are arranged at the front ends of the trailing arms 2b. The front ends of the trailing arms 2b rotatable about an axis of rotation 15.

In the disclosed example at least one micro-electromechanical system 8 (MEMS), designed as an actuator, is arranged on or associated with each bearing 6. The MEMS 8 arranged on or associated with each bearing 6 is an actuator because it causes a mechanical movement. Therefore, the MEMS 8 arranged on, or associated with, each bearing 6 causes movement of the bearing 6 or counteracts movement of the bearing 6.

Multiple MEMS 8 can also be arranged on or associated with each bearing or bearings 6, and can comprise MEMS designed as actuators, for obtaining energy, and as sensors. As an electromechanical device, the actuator MEMS 8 includes electromotive positioning elements. In another example the MEMS 8 interacts with additional, larger actuators; for example, they act in a regulating manner wherein the additional actuators include electromotive, hydraulic, or pneumatic positioning elements.

The system enables, depending on the situation, setting bearing hardness in the region of the bearings 6 by the action of the MEMS 8. For example, the hardness of relatively soft rubber bearings increases as needed by the action of MEMS 8 designed as actuators. An action, when using conventional means achievable by changing or substituting another material.

Preferably, each bearing 6, or a component thereof, is movable by means of the corresponding MEMS in relation to the vehicle body in the motor vehicle longitudinal direction 13. Wherein movement of the twist beam axle 2 about the vertical motor vehicle axis can be caused, or counteracted, by movement of the bearing 6. The actuators are preferably linear actuators. Because of the linear movement of the actuators, the force action thereof via the bearings 6 can be transmitted in a line in the motor vehicle longitudinal direction 13 to the trailing arms 2b. The MEMS designed as actuators can also be operationally connected to further actuators, which are not MEMS.

Figure 2:
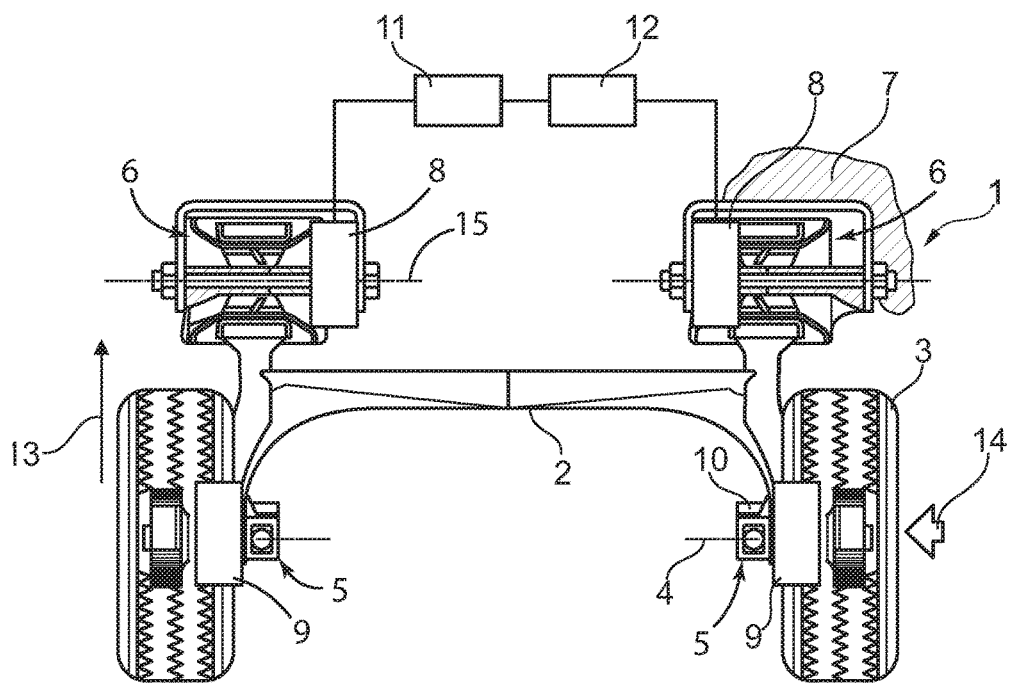
FIG. 2 shows the embodiment of FIG. 1 having additional MEMS associated with the wheels.

As illustrated in FIG. 2, at least one MEMS 9, designed, as an actuator, is associated with or adjacent each wheel mount 5. Therefore, the MEMS 9 on the wheel mount 5 causes movement of the wheel 3 or counteracts movement of the wheel 3.

As illustrated in FIG. 2, the system 1 may include MEMS 9 near the wheels 3, which are arranged on the wheel mounts 5. These MEMS 9 are preferably also MEMS designed as actuators, but can also be MEMS designed for obtaining energy or as sensors. The above-mentioned statements apply accordingly for the MEMS 9, arranged on the wheel mounts 5 and designed as actuators. The actuator MEMS arranged on the wheel mount 5 causes a movement of the wheel 3.

In one example, an associated MEMS moves each wheel mount 5 and correspondingly each wheel 3 in relation to the vehicle body such that movement of the wheels 3 is caused or movement of the wheels 3 is counteracted by movement of the wheel mounts 5.

The MEMS 8, 9 are preferably a MEMS designed as an actuator, but can also be a MEMS designed for obtaining energy or as a sensor.

In an additional example at least one MEMS designed as a sensor is arranged on or associated with each bearing 6 and each wheel mount 5. Therefore, during operation of the motor vehicle, continuous information can be ascertained about the position of the bearings 6 and the wheel 3 position, and therefore about diverse parameters of the travel properties. Whereby information about the status of the motor vehicle can be dynamically obtained. As sensors, MEMS 8, 9 function in particular as inertial sensors; i.e., they measure acceleration and rotation rates.

Additional sensors may be arranged on the wheel mounts 5, bearings 6, and other points. These sensors can comprise MEMS but can also be conventional sensors for parameters of the vehicle operation or behavior properties, for example, the travel velocity or suspension.

The sensor MEMS may acquire vehicle parameters such as velocity and acceleration in the longitudinal direction, roll, pitch, and yaw movements and rates of the motor vehicle, toe and camber changes of the wheels 3, and rocking movements of the twist beam axle 2. The system has additional sensors 10, which can be arranged at diverse points in the system. The sensors can be MEMS and/or sensors that are not MEMS. The sensors 10 also acquire the above-mentioned vehicle parameters.

The MEMS in the system according to the invention are preferably arranged at various points of the wheel mounts and bearings and have various geometric shapes adapted to the wheel mounts and bearings. In particular, MEMS designed as sensors can record measured values at various points.

As illustrated in FIGS. 1-2, the system 1 includes a regulating unit 11 and a control unit 12. The regulating unit 11 acquires the data recorded by the sensors, particularly sensor MEMS, on relevant parameters, analyzes the data and transmits the results to the control unit 12. The control unit 12 transmits corresponding control commands, including an output signal, to the MEMS 8, 9.

A control unit 12 controls the activity of each MEMS. The control unit 12 activates the MEMS actuators depending on the sensor data and set target values. The control unit 12 determines whether MEMS actuators are used for moving the bearing/wheel mount and whether MEMS are used for obtaining energy in specific situations. The regulating unit 11, which is connected to the control unit 12, acquires and analyzes the data and parameters recorded by the MEMS and other sensors to specify positions to be set for the actuators. The actuators are activated to act in a stabilizing manner on the motor vehicle by the control unit using corresponding control commands.

In the example illustrated in FIG. 1, each bearing 6 preferably has bushings, which each comprise an outer metal element 16, a core made of an elastomer 17, and an inner metal element 18. Here, the elastomer 17 is ideally rubber, because rubber enables a connection from the twist beam axle 2 to the vehicle body 7, wherein oscillations are damped. The trailing arms 2b of the twist beam axle 2 are connected to the actuator MEMS 8 via the inner metal elements 18. The connection of bearings 6 and actuators 8 may include further components required for the connection, for example, adapters, bolts, and screws. If an actuator 8 moves, this movement is transferred via this connection to the twist beam axle 2, and a rotational movement of the twist beam axle 2 about the vertical vehicle axis is caused or a corresponding movement of the twist beam axle 2 is counteracted.

In a further example, at least one MEMS designed for obtaining energy, is arranged on each bearing and/or each wheel mount. Here vibrations or movements of the twist beam axle 2 in relation to the vehicle body are converted into electrical energy by means of the MEMS. The advantage of obtaining energy with the MEMS is autonomously obtaining energy that can be used for operating the MEMS-based sensors and actuators. Energy obtained by MEMS can be used for operating further systems of the motor vehicle and for charging its battery.

The MEMS according to one example of the invention has piezoelectric elements. Utilizing the piezo effect, it is effectively possible to generate energy from vibrations on the bearings or movements of the wheels in relation to the vehicle body or twist beam axle and of the twist beam axle in relation to the vehicle body.

The energy-obtaining MEMS convert mechanical into electrical energy. Vibrations, but also other movements, on the bearings 6 and wheels 3 of the motor vehicle are used as the mechanical energy source. MEMS having piezoelectric elements are used in particular. Vibrations arising during movement of the motor vehicle at the bearings 6 and movements of the trailing arms 2b of the twist beam axle 2, shifted forward or to the rear by twisting of the twist beam axle 2 during maneuvers, are used by the MEMS 8 on the bearings 6. Movements of the wheels 3, toe and camber changes, are used by the MEMS 9 on the wheel mounts 5, wherein the wheels 3 act on the MEMS by way of the movement thereof in the transverse direction 14 and electrical energy is generated by the MEMS at the same time. The electrical energy obtained by the MEMS designed for obtaining energy is used for operating the MEMS in the system, and can furthermore be used for operating other electrical devices in the motor vehicle or for charging the motor vehicle battery.

Figure 3:
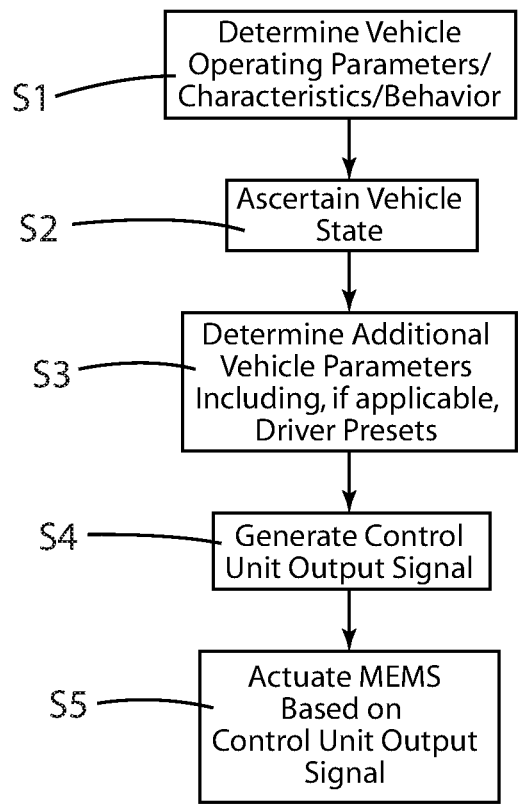
FIG. 3 is a flow chart of an embodiment of a method according to the invention.

FIG. 3 illustrates a first step S1 for dynamically setting the travel properties of a motor vehicle, including determining vehicle operating parameters/characteristics/behavior based on several measured values recorded by at least one MEMS designed as a sensor. Further, sensors that are not MEMS can also record measured values. The measured values relate to the velocity of the motor vehicle and/or the wheels, steering wheel angle, lateral acceleration, yaw rate, braking torque, and motor values such as the rotational speed. The measured value is transmitted to the regulating unit 11, which ascertains the status of the motor vehicle in step S2 from one or more acquired measured values. To ascertain the motor vehicle status (vehicle state estimation, VSE), the so-called Kalman filter is used, a mathematical model, using which the VSE is ascertained in consideration of and removal of interference caused by sensors.

In step S3, further parameters are ascertained by MEMS or other sensors and transmitted to the control unit 11, including the camber and toe of the rear wheels and front wheels, oversteering or understeering due to lateral forces, stability indices, steering transmission ratio, and damping coefficients and suspension characteristic variables of the present motor vehicle. Required control commands are calculated from the VSE and the further data, and are used for stabilizing vehicle behavior. For this purpose, presets are also incorporated into the calculation, which presets are performed by the driver. Presets can be performed as a mode, for example, as a normal, sport, or comfort mode.

In the comfort mode, travel is ideally primarily straight ahead and there is little steering or cornering. For this purpose, the MEMS on the bearings 6 and wheel mounts 5 are set so MEMS designed for obtaining energy are activated and energy is preferably obtained, while in contrast the bearing and wheel movements are counteracted little or not at all by MEMS designed as actuators. In the normal mode, for example, during cornering, the MEMS are set so the forces acting in the transverse direction 14 are counteracted by the MEMS designed as actuators on the bearings 6 and wheel mounts 5, but energy can also be obtained by the MEMS on sections having longer calm straight ahead travel. In the sport mode, the MEMS designed for obtaining energy are not activated, and the MEMS designed as actuators on the bearings 6 and wheel mounts 5 are set so changes on the wheels or bearings can be counteracted. For example, the bearings 6 are set harder than bearings made of the same material without MEMS.

In step S4, a command is output by the control unit 12 to the actuator MEMS 8 under the ascertained VSE and required reactions for stabilizing the travel behavior. In step S5, the bearings are moved by the MEMS 8 in accordance with the calculations of the regulating unit 11 such that they counteract the movements of the twist beam axle 2 in a stabilizing manner. Alternatively, a control command can also be output to the actuator MEMS 9, which thereupon move the wheels 3 via the wheel mounts 5 and above all counteract steering forces transverse to the travel direction 14.

If the status of the motor vehicle is such that no stabilization of vehicle behavior must be performed, the MEMS designed for obtaining energy are activated by the control unit 12 in step S4, which MEMS thereupon obtain energy from the movements of the motor vehicle on the bearings 6 and/or on the wheels 3 in step S5.

According to the disclosed embodiment, the present invention provides a device, which with a high level of travel comfort, counteracts lateral forces acting in the transverse direction of the motor vehicle.

According to the disclosed example, the present invention provides a motor vehicle having a twist beam axle 2 having a crossbeam 2a and two trailing arms 2b connected thereto. On the rear ends thereof, in the motor vehicle longitudinal direction, wheel mounts are provided for fastening a motor vehicle wheel. The front ends of the trailing arms 2b are connected via a bearing 6 to the motor vehicle body, wherein at least one micro-electromechanical system (MEMS) 8 designed as an actuator is connected to each bearing 6.

As disclosed the invention includes a method for dynamically setting vehicle properties of a motor vehicle having a twist beam axle 2 having a crossbeam 2a and two trailing arms 2b connected thereto. Each trailing arm 2b, provided on the rear end thereof, in the motor vehicle longitudinal direction, with a wheel mount 5 for fastening a motor vehicle wheel 3. Each trailing arm 2b connected on the front ends thereof via a bearing 6 to the motor vehicle body 7. The wheel mounts 5 and bearings 6 are each connected to at least one MEMS 8, 9. The method includes acquiring several measured values by way of at least one MEMS designed as a sensor. Ascertaining the status of the motor vehicle from the measured values by way of a regulating unit and determining further parameters of the motor vehicle status by way of a MEMS designed as a sensor or other sensors. Outputting at least one control command by way of a control unit and moving the bearings and/or the wheel mounts by a MEMS designed as an actuator(s) in accordance with the control command.

The movement of the actuator(s) and accordingly the bearings and/or the wheel mounts performed, depending on the ascertained motor vehicle status, to counteract unfavorable motor vehicle dynamics, particularly for the stabilization of the motor vehicle against forces acting in the transverse direction.

In addition, according to a further example of the present invention, it is possible to obtain energy depending on the ascertained motor vehicle status by a MEMS designed for obtaining energy. Here, the MEMS converts mechanical energy into electrical energy. The energy used for operating the MEMS in the system according to the invention. The energy can be obtained from vibrations, or from forces acting in the transverse direction of the motor vehicle from movements of the twist beam axle and/or the wheels.

Additional MEMS and/or further sensors may be at further points of the motor vehicle preferably to measure parameters of the vehicle status, wherein data is advantageously obtained, in particular data used for ascertaining motor vehicle status.

In addition, the control unit monitors the activity of the MEMS depending on settings predefined by a user. Here, the user can set an operating mode that relates to a specific driving mode. The presets are incorporated with the data measured by the sensor MEMS and the status of the motor vehicle ascertained therefrom incorporated into the control commands of the control unit.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle suspension system comprising:
   a twist beam axle having a crossbeam and a trailing arm having a front end;
   a bearing, having a bearing hardness based on an elastomeric element, connecting said front end to the vehicle; and
   a MEMS functioning as an actuator and acting on said elastomeric element to control said bearing hardness.

2. The system of claim 1 including said trailing arm having a rear end and a wheel mount located at said rear end; and
   a MEMS functioning as an actuator located adjacent said wheel mount.

3. The system of claim 1 including a MEMS functioning as a sensor located adjacent said bearing.

4. A vehicle suspension system comprising:
   a twist beam axle having a crossbeam and a trailing arm having a front end;
   a bearing, having an outer element, and inner element and an elastomeric element between said inner and outer element, connecting said front end to the vehicle;
   a MEMS functioning as an actuator located adjacent said bearing, said actuator engaging and moving said inner and outer elements relative to one another;
   said trailing arm having a rear end and a wheel mount located at said rear end;
   a MEMS functioning as an actuator located adjacent said wheel mount; and
   sensors arranged on the bearings, wheel mounts, and other points.

5. The system of claim 1 wherein each bearing is movable by the MEMS in relation to a vehicle body in a vehicle longitudinal direction such that a movement of the twist beam axle about a vertical vehicle axis is caused or a movement of the twist beam axle is counteracted.

6. The system of claim 2 wherein each wheel mount is movable by the MEMS in relation to a vehicle body such that a movement of the wheel is caused or a movement of the wheel is counteracted.

7. A vehicle suspension system comprising:
   a twist beam axle having a crossbeam and a trailing arm having a front end;
   a bearing connecting said front end to the vehicle;
   a MEMS functioning as an actuator located adjacent said bearing;
   said trailing arm having a rear end and a wheel mount located at said rear end;
   a MEMS functioning as an actuator located adjacent said wheel mount; and
   at least one additional MEMS designed for obtaining energy arranged on each bearing or each wheel mount.

8. The system of claim 7 wherein the MEMS includes piezoelectric elements.

9. A vehicle suspension system comprising:
   a twist beam axle having a crossbeam and a trailing arm having a front end;
   a bearing, having an outer element and an inner element, connecting said front end to the vehicle;
   a MEMS functioning as an actuator located adjacent said bearing, said MEMS moving said inner element relative to said outer element;
   said trailing arm having a rear end and a wheel mount located at said rear end;
   a MEMS functioning as an actuator located adjacent said wheel mount; and
   wherein the MEMS are arranged at various points of the wheel mount and bearing and have various geometric shapes adapted to the wheel mount and bearing.

10. The system of claim 1 wherein the activity of said MEMS is controlled by a control unit.

11. A vehicle suspension system comprising:
    a twist beam axle having a crossbeam and a first and second trailing arm, each of said first and second trailing arms having a front end and a rear end;
    a bearing, having an outer element and inner element, connecting said front ends of said first and second trailing arms to a vehicle body;
    each of said rear ends of said first and second trailing arms having a wheel mount;
    a MEMS functioning as an actuator located adjacent said wheel mount; and
    a MEMS functioning as an actuator located adjacent said bearing, said actuator engaging and moving said inner and outer elements relative to one another.

12. The system of claim 11 wherein each bearing is movable by the MEMS in relation to a vehicle body in a vehicle longitudinal direction such that a movement of the twist beam axle about a vertical vehicle axis is caused or a movement of the twist beam axle is counteracted.

13. The system of claim 12 wherein each wheel mount is movable by the MEMS in relation to a vehicle body such that a movement of the wheel is caused or a movement of the wheel is counteracted.

14. The system of claim 11 including each bearing movable by the MEMS in relation to a vehicle body in a vehicle longitudinal direction such that a movement of the twist beam axle about a vertical vehicle axis is caused or a movement of the twist beam axle is counteracted;
    each wheel mount movable by the MEMS in relation to a vehicle body such that a movement of the wheel is caused or a movement of the wheel is counteracted; and
    at least one additional MEMS designed for obtaining energy arranged on at least one of said bearing or said wheel mount.

15. A method for controlling a vehicle suspension having a crossbeam and two trailing arms connected thereto comprising:
    providing a bearing, having an outer element and an inner element, connecting each of the front ends of the trailing arm to the vehicle body; and
    providing a MEMS adjacent each of the bearings, each of said MEMS functioning as an actuator; and using said MEMS to move one of said inner or outer elements of said bearings in relation to the vehicle body.

16. The method of claim 15 including the steps of
providing a wheel mount at a rear end of each trailing arm; and
providing a MEMS adjacent each of the wheel mounts, each of said MEMS functioning as an actuator; and
using said MEMS to move the wheel mounts in relation to the vehicle body.

17. The method of claim 15 including providing the suspension with at least one MEMS designed for obtaining energy based on movement of the twist beam axle in relation to the vehicle body.

18. A method for controlling a vehicle suspension having a crossbeam and two trailing arms connected thereto comprising:
providing a bearing, having an outer element and an inner element, connecting each of the front ends of the trailing arm to the vehicle body; and
providing a MEMS adjacent each of the bearings, each of said MEMS functioning as an actuator;
using said MEMS to move one of said inner or outer elements of said bearings in relation to the vehicle body; and
additional MEMS and/or further sensors operative to measure motor vehicle characteristics or parameters.

19. A method for controlling a vehicle suspension having a crossbeam and two trailing arms connected thereto comprising:
providing a bearing, having an outer element and an inner element, connecting each of the front ends of the trailing arm to the vehicle body; and
providing a MEMS adjacent each of the bearings, each of said MEMS functioning as an actuator;
using said MEMS to move one of said inner or outer elements of said bearings in relation to the vehicle body; and
a control unit operative to monitor the activity of the MEMS the pending on settings predefined by a user.

* * * * *